Sept. 9, 1969         H. R. HART, JR              3,466,504
CONTINUOUS SHUNT PROTECTION MEANS FOR SUPERCONDUCTING SOLENOIDS
Filed June 28, 1967
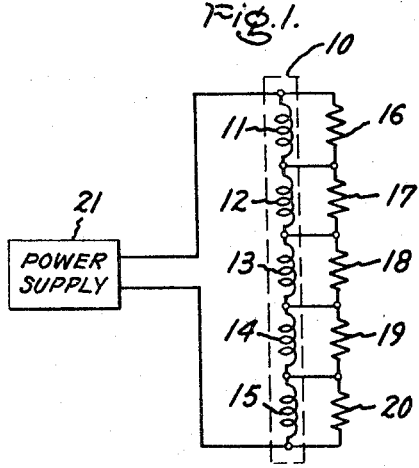
PRIOR ART
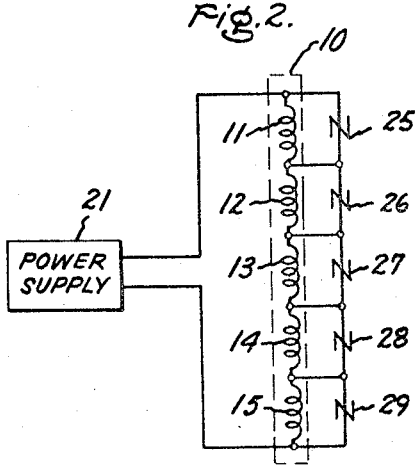
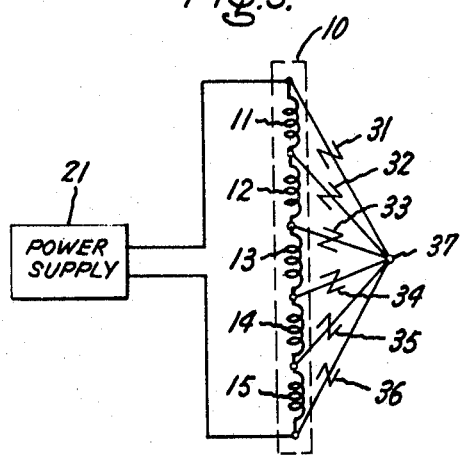
Inventor:
Howard R. Hart Jr.,
by Marvin Snyder
His Attorney.

United States Patent Office 3,466,504
Patented Sept. 9, 1969

3,466,504
CONTINUOUS SHUNT PROTECTION MEANS
FOR SUPERCONDUCTING SOLENOIDS
Howard R. Hart, Jr., Schenectady, N.Y., assignor to
General Electric Company, a corporation of New
York
Filed June 28, 1967, Ser. No. 649,498
Int. Cl. H02h 7/00, 3/28
U.S. Cl. 317—13                                    7 Claims

ABSTRACT OF THE DISCLOSURE

Protection of a superconducting coil is achieved by shunting sections thereof with a high current capacity germanium diode having a low conduction threshold voltage of either polarity. As long as the voltage drop across each section of the coil is below this threshold, the diode across this section is nonconductive and effectively acts as an open circuit in parallel with the section. Once a voltage drop greater than this threshold appears however, the diode conducts, shunting current away from this section of the coil.

BACKGROUND OF THE INVENTION

This invention relates to cryogenic protective circuitry and more particularly to circuitry for preventing damage to a superconducting coil in the event a portion thereof goes normal.

A superconducting coil, such as a high magnetic field superconducting solenoid, is typically energized with current furnished either by a conventional external power supply or an electrical flux pump of the type shown and described in T. A. Buchold, Superconductive Power Supply and Its Application for Electrical Flux Pumping, Cryogenics, vol. 4, pp. 212–217 (August 1964). The flux pump operates to furnish large amplitude currents at cryogenic temperature levels, and has the advantage that its large amplitude output currents always remain within a low temperature environment. Because the flux pump of the aforementioned type includes a persistent switch in shunt therewith, the output currents can be made permanent in the event pumping is stopped. Hence, the superconducting coil of the instant invention, which is usually energized by a conventional external power supply including, if desired, a persistent current switch in shunt therewith, may, in the alternative, be energized by a flux pump of this type.

Superconducting coils of highly desirable electrical and magnetic properties may be comprised of diffusion precessed niobium-tin tape of the type shown and described in M. G. Benz, Superconducting Properties of Diffusion Processed Niobium-Tin Tape, I.E.E.E. Transactions on Magnetics, vol. MAG–2, pp. 760–764 (December 1966), which readily lends itself to fabrication in modular form. In operating large superconducting solenoids of this type however, it has been found highly desirable to add protective means to the coil in order to prevent the coil from damaging itself due to heating in the event a portion of the coil should inadvertently go normal while conducting large amplitude current. Once a portion of the coil has switched from its superconducting to its normal state, thereby introducing resistance into the coil, resistive heating in the normal portion thereof results in a high temperature which can damage the coil. If on the other hand an external resistance is switched into series with the coil in order to dissipate heat outside the cryogenic environment, a rapid current decay may result in development of a high induced voltage across the coil and consequential deleterious arcing.

To overcome the aforementioned difficulties, resistance means have heretofore been connected in shunt with the coil. The ohmic value of such resistance means when in shunt with a coil exceeds the resistance value of the coil when the windings of the coil are superconducting, but is less than the resistance value of the coil when any portion of the windings of the coil is normal, or not superconducting. While resistance means connected in such manner may provide satisfactory protection of the windings, the electrical time constant of the coil is greatly lengthened, due to the resistance added in shunt therewith. Because of this long time constant, a duration of up to several hours may be required in order to attain sufficient current flow through the coil to produce the entire magnetic field of which it is capable.

The problem of localized heating in superconducting coils has been diminished somewhat by subdividing the coils into a plurality of sections, each section having a resistance connected in shunt therewith. Because of the mutual inductance between sections of a coil, current quenching initiated in any one section, due to a change to the normal state occurring within the section, immediately induces an increase in current in each of the other sections. That is, a drop in current in one section of the coil induces an increase in current in the other sections, through mutual inductance of the sections. Consequently, since the whole coil, when in proper operation, carries a current near its critical value, or value above which the coil switches into its normal state, current quenching, if begun in any one section, is immediately initiated in each of the other sections. On the other hand, with but a single resistance connected in shunt with the coil, current quenching begins at one point in the coil and propagates at a slower rate, so that it may not even reach the other end of the coil before the current has essentially completely decayed. The limited propagation of the normal region in such case may be insufficient to avoid damage due to localized heating of the coil. However, even when the coil is subdivided into a plurality of sections with each section being shunted by a separate resistance, the electrical time constant involved is still considerably longer than desirable. By use of the instant invention, the magnitude of electrical time constant for the coil is drastically reduced from this value.

Moreover, when the magnetic field of the solenoid subdivided into a plurality of sections is varied, appreciably large induced voltages are applied across the resistances in shunt therewith, resulting in a significant amount of ohmic heating. This ohmic heating, however, is obviated by use of the instant invention.

SUMMARY OF THE INVENTION

One object of the invention is to provide a super-conducting coil with shunt protection against burnout and overheating, having a shorter electrical time constant than heretofore deemed possible.

Another object is to provide a superconductive solenoid wherein protective circuitry is continuously connected in shunt with sections of the solenoid without adding to the heat developed in energizing the solenoid or varying the field of the solenoid.

Another object is to provide means for rapidly removing energy from a superconducting solenoid when required, without detriment to the solenoid itself or its electrical time constant.

Briefly, in accordance with a preferred embodiment of the invention, protective circuitry for a super-conducting solenoid subdivided into a plurality of groups of windings is provided. Semiconductor diode voltage limiter means rendered conductive only when voltage thereacross exceeds a predetermined threshold level are continuously coupled across each of the respective groups of windings so as to conduct only whenever the voltage across each of the corresponding groups respectively exceeds a predetermined value.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIGURE 1 is a schematic diagram of a superconducting solenoid including protective means in shunt therewith, as used in the prior art;

FIGURE 2 is a first embodiment of the super-conducting solenoid protective means of the instant invention; and FIGURE 3 is a second embodiment of the super-conducting solenoid protective means of the instant invention.

DESCRIPTION OF THE PREFERRED EMBODIMENTS

It is known that when one point in a superconducting coil goes normal, the interface between superconducting and normal regions propagates through the conductor comprising the coil into the superconducting region thereof, due to the heat conducting properties of the conductor, at approximately a constant rate, at least in the initial phase of its movement. This propagation is due to heating of the normal region as a consequence of current flow therethrough when heat is generated at a rate exceeding capacity for its removal. Expansion of the normal region continues in this manner until either the end of the conductor is reached by the normal region or the stored energy in the coil has been dissipated. Once the entire coil has gone normal, danger of damage due to any portion thereof is essentially eliminated because the coil resistance is then sufficiently high to limit amplitude of current therein. Until the entire coil has gone normal however, coil resistance remains low enough to permit high current to pass through the small normal region, so that heating losses in the normal region may raise the coil temperature to a level which is destructive to the coil. If a resistance is connected in shunt with the coil, the stored energy of the coil may be dissipated at a rapid rate, due to existence of an alternate current path therefor. However, not only is the electrical time constant of the coil lengthened by presence of this resistance, but propagation of the normal condition through the coil is not accelerated thereby, and may even be slowed. In an effort to improve protection of superconducting coils, the circuit of FIGURE 1, which is known in the prior art, was developed.

In FIGURE 1, a superconducting coil 10 is shown made up of a plurality of groups of windings 11–15, each group being shunted by a resistance 16–20 respectively which may be comprised of Nichrome wire for example. Coil 10 is energized by a power supply which may comprise a conventional external power supply or, in the alternative, may comprise a flux pump 21 such as the type described in the aforementioned article by T. A. Buchhold.

Resistances 16–20 function to protect coil 10 by absorbing energy from the magnetic field of the coil in the event a portion of the coil should go normal, as described by P. F. Smith in Protection of Superconducting Coils, The Review of Scientific Instruments, vol. 34, pp. 368–373 (April 1963). The advantage of using separate resistances in shunt with groups of windings resides in the fact that such arrangement greatly accelerates propagation of the normal region through the entire superconducting coil, so as to protect the coil from damage due to long term conduction of high currents through a normal region of the coil. Hence, if one winding in a group of windings, such as 13, should go normal, a voltage is immediately produced across the group of windings 13. Through the mutual inductances of the groups of windings, this voltage immediately induces an additional current in each of the other groups of windings of the coil. Because the coil has been carrying current of amplitude close to its critical value, or value above which the magnetic field and current density combine to switch the coil into its normal state, the increase in current rapidly switches at least a major portion of the coil into its normal state, thereby achieving protection unobtainable when a single resistance is connected in shunt with the entire coil. As previously pointed out, once the entire coil has switched into its normal state, current passing therethrough is insufficient to produce excessive resistive heating in the coil so that the coil is essentially protected against destruction and even against an excessive increase in temperature which would unduly delay a return to the superconducting state. However, the circuit of FIGURE 1 suffers from the disadvantage of having a greatly increased electrical time constant, as previously described for the circuit in which a single resistance is connected in shunt across the entire superconducting solenoid, and for the same reasons. Typical time constants of superconducting solenoids in shunt with resistances as illustrated in FIGURE 1 may range up to one-half hour or more. As a second disadvantage, heat is dissipated in the resistances whenever the solenoid field is varied, due to the induced voltages produced thereacross.

The embodiment of FIGURE 2 provides means for achieving the superconducting solenoid protection provided by the circuit of FIGURE 1, without the attendant disadvantage of the long electrical time constant inherent in the circiut of FIGURE 1. The low temperature voltage limiter described in R. N. Hall application Ser. No. 627,176 filed Mar. 30, 1967 is utilized to provide shunt paths for induced currents only when at least a portion of the superconducting solenoid has gone normal. Thus, in FIGURE 2, semiconductor diode voltage limiters 25–29 of the type described in the aforemenitoned Hall application, which may be comprised of germanium, are connected in shunt with sections 11–15 respectively of superconducting solenoid 10 which is shown receiving energy from power supply 21. The characteristics of these diode voltage limiters, which are operable at liquid helium temperature levels together with the superconducting solenoid, are such that as long as the voltage across the limiter remains below a predetermined threshold level, the limiter presents a relatively high resistance to passage of current therethrough. This resistance, which may be approximately 25 ohms or slightly greater, is sufficiently great that each of these groups of windings is effectively unshunted when in the superconducting condition. Hence, the electrical time constant of the superconducting coil is essentially unaffected by presence of voltage limiters 25–29, and ohmic heating of the voltage limiters is insignificant. On the other hand, a rise in voltage of either polarity above the aforemenitoned predetermined threshold level, which may be in the range of .02 to 1.0 volt, results in impact ionization of impurities in the limiter, which thereupon immediately switches into a very low impedance condition which may be in the range of $10^{-3}$ to $10^{-4}$ ohms capable of carrying current in the order of one thousand amperes or more. Thus, as described in conjunction with the circuit of FIGURE 1, if a portion of a group of windings, such as 13, should go normal, current is switched through the diode voltage limiter is shunt therewith, here limiter 27 and voltages induced by mutual inductance cause an increase through each of the remaining winding groups of the coil, so that the coil rapidly switches into its normal condition without any deleterious effect due to existence of the initial normal region in winding group 13. When the voltage across winding group 13 returns to an amplitude below the aforementioned predetermined level, limiter 27 reverts to its high impedance condition. When the remaining voltage limiters likewise revert to their high impedance states, superconducting solenoid 10 can once again be energized by the current from power supply 21. It should be noted that winding groups 11–15 lend themselves readily to construction in modules of the diffusion processed niobium-tin tape described in the aforementioned Benz article, conveniently permitting the diode voltage limiters to be soldered in shunt therewith.

FIGURE 3 illustrates a second embodiment of the invention wherein all the voltage limiters connected to superconducting solenoid 10 may be joined to a common heat sink at a junction 37. In this embodiment, each of winding groups 11–15 of coil 10 is shunted by a pair of voltage limiters 31 and 32, 32 and 33, 33 and 34, 34 and 35, and 35 and 36 respectively.

Operation of the circuit of FIGURE 3 is essentially identical to that of the circuit of FIGURE 2, with the major exception being that if any of the winding groups goes normal, two diode voltage limiters in series are switched into conduction thereacross. Although when a pair of series-connected diode voltage limiters are in conduction, the voltage across the winding group in parallel therewith is twice that for the same condition in the circuit of FIGURE 2, provided the diode voltage limiters have substantially identical characteristics, limiters 31–36 may be designed with even less conduction impedance so as to exhibit a conduction voltage drop of approximately one-half that of voltage limiters 25–29 of FIGURE 2, allowing operating conditions of the circuits of FIGURES 2 and 3 to be made essentially idenitcal if desired. The circuit of FIGURE 3 requires only one diode voltage limiter more than the number required by the circiut of FIGURE 2, since each limiter connected to a junction between two adjacent winding groups is connected in series circuits shunted across each of the two adjacent winding groups respectively.

The foregoing describes a superconducting coil with shunt protection against burnout and overheating, having a shorter electrical time constant than heretofore deemed possible. Protective circuitry is continuously connected in shunt with sections of the solenoid without adding to the heat developed in energizing the solenoid or varying the field of the solenoid. Energy can thus be removed from the superconducting solenoid when required, without detriment to the solenoid itself or its electrical time constant.

I claim:
1. In a protection circuit for a superconducting solenoid, said solenoid being subdividable into a plurality of segments, the combination comprising a plurality of voltage limiter diode means, each of said voltage limiter diode means being rendered highly conductive only when voltage thereacross exceeds a predetermined threshold level, at least one of said plurality of voltage limiter diode means being connected in shunt with each segment of said solenoid respectively so that each of said voltage limiter diode means is rendered highly conductive when voltage across said each segment connected in shunt therewith exceeds said predetermined threshold level.

2. The protection circuit of claim 1 wherein each of said plurality of voltage limiter diode means are comprised of a semiconductor and are maintained in a cyrogenic environment in common with said superconducting solenoid and energizing means therefor, said diode means being rendered conductive through impact ionization of impurities therein.

3. The protection circuit of claim 1 wherein each of said plurality of voltage limiter diode means are comprised of a semiconductor and two of said plurality of voltage limiter diode means are connected in series across each segment of said solenoid respectively.

4. The protection circuit of claim 3 wherein one side of each of said voltage limiter diode means is joined at a common electrical junction.

5. The protection circuit of claim 4 wherein said common electrical junction comprises a common a heat sink for each of said voltage limiter diode means.

6. The protection circuit of claim 4 wherein at least one of the voltage limiter diode means across each of said segments of said solenoid also comprises one of the voltage limiter diode means across an adjacent segment of said coil respectively.

7. The protection circuit of claim 5 wherein said voltage limiter diode means are maintained in a cryogenic environment in common with said superconductive solenoid and energizing means therefor, said diode means being rendered conductive through impact ionization of impurities therein.

References Cited
UNITED STATES PATENTS

| 3,370,208 | 2/1968 | Mizushima et al. | 317—234 |
| 3,305,699 | 2/1967 | Watrous et al. | 317—13 |
| 3,370,208 | 2/1968 | Mizushima et al. | 317—234 |

LEE T. HIX, Primary Examiner

J. D. TRAMMELL, Assistant Examiner

U.S. Cl. X.R.

307—307; 317—31, 123